July 19, 1966  B. G. J. TIBELL  3,261,343
APPARATUS FOR HEATING FOOD
Filed Feb. 21, 1964  5 Sheets-Sheet 1
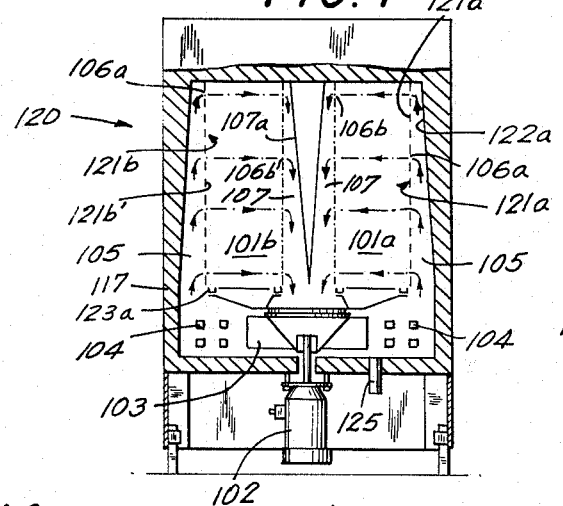
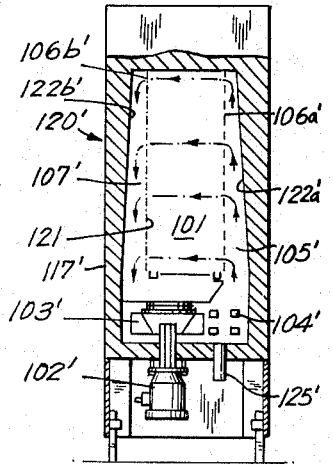
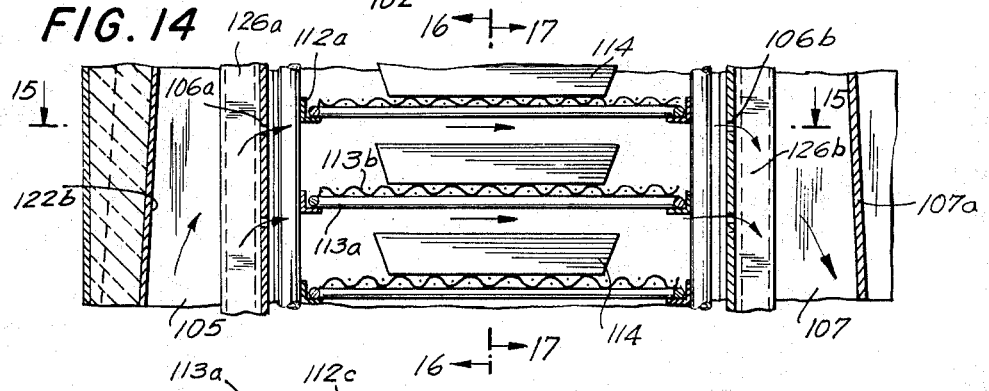
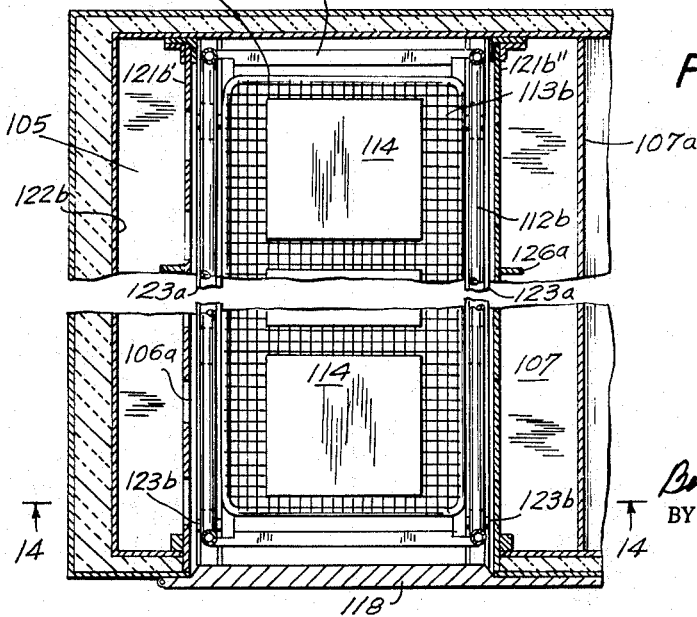
INVENTOR.
Bengt Gunnar Julius Tibell
BY
his ATTORNEY

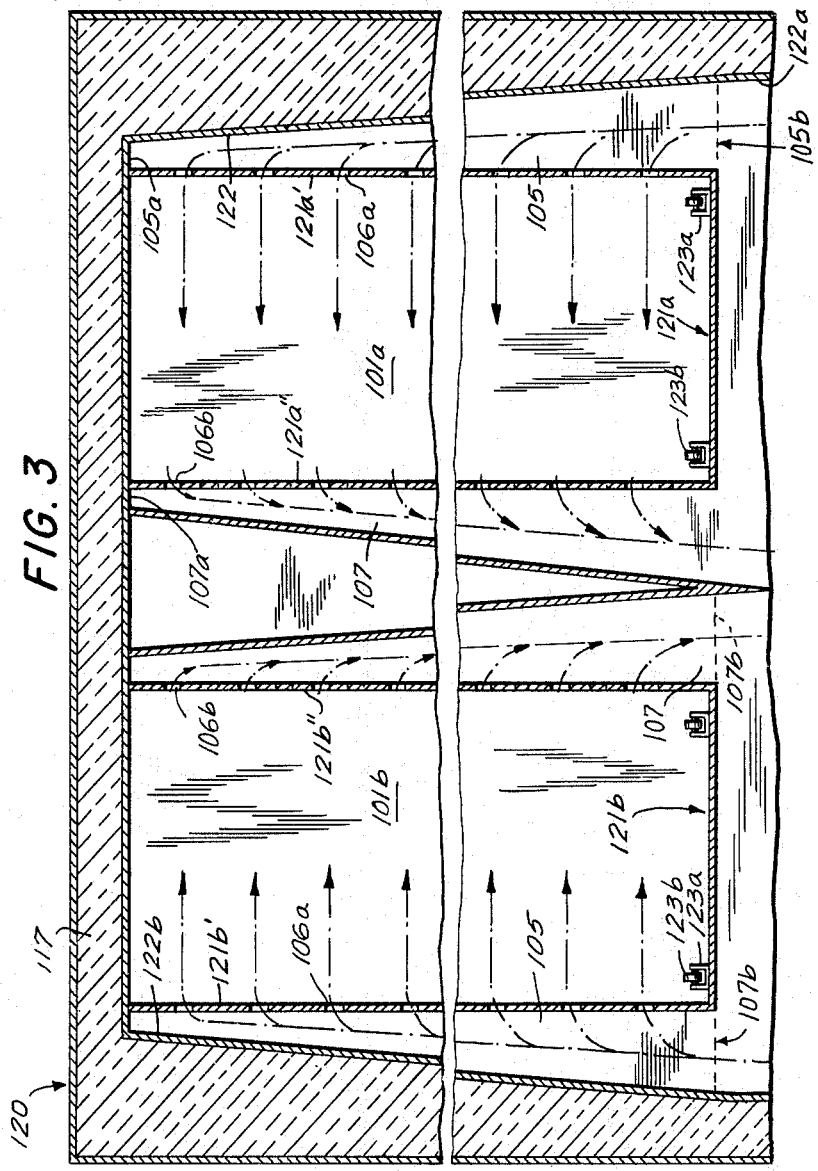

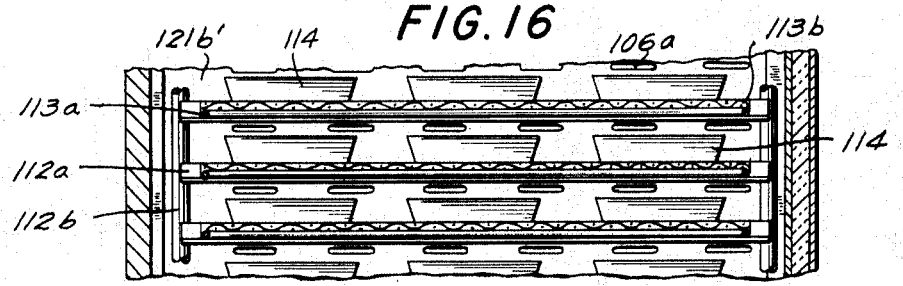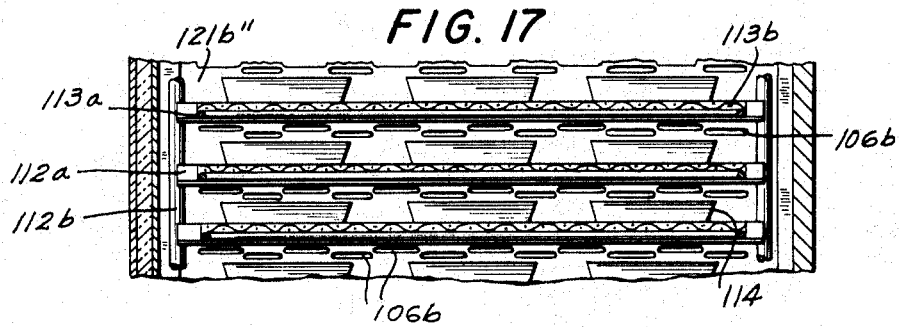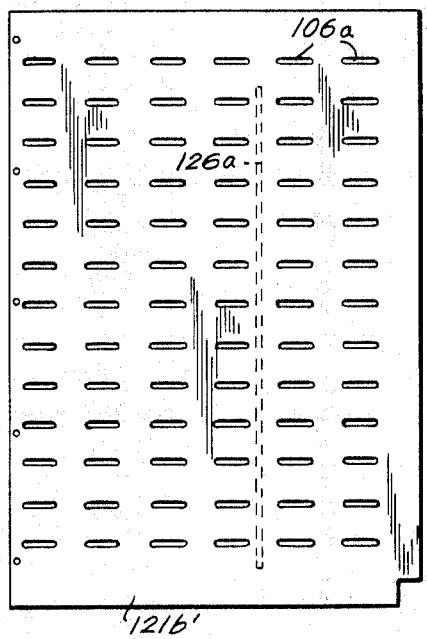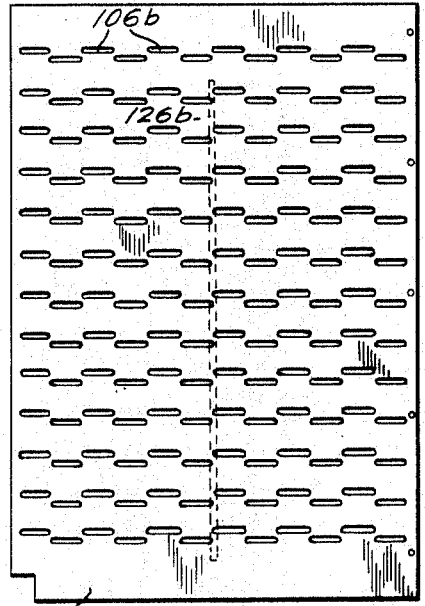

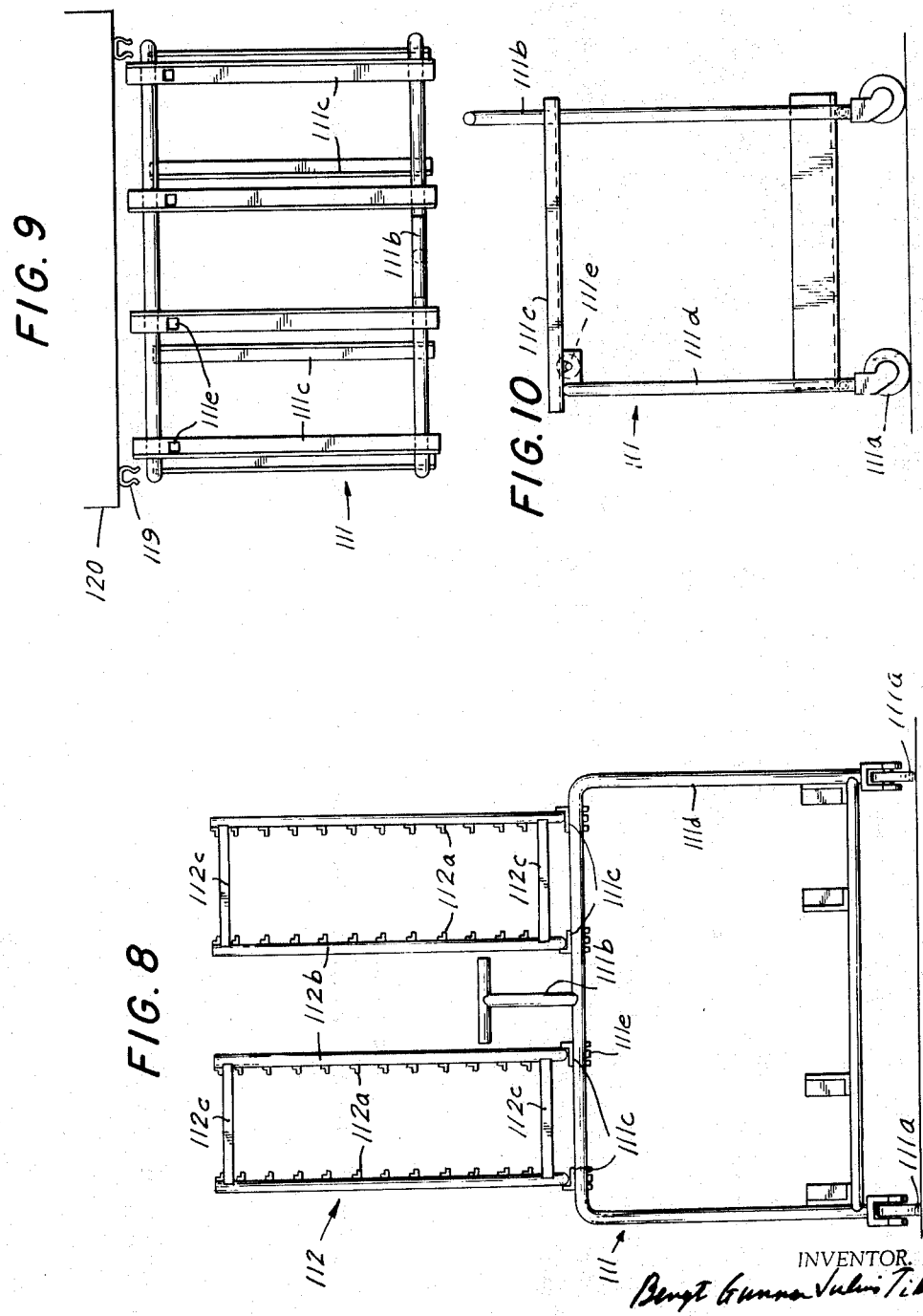

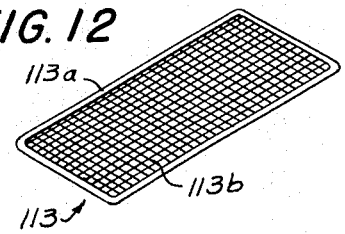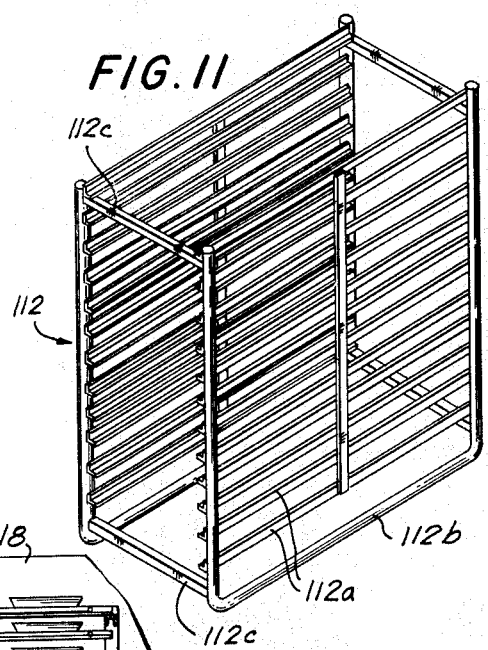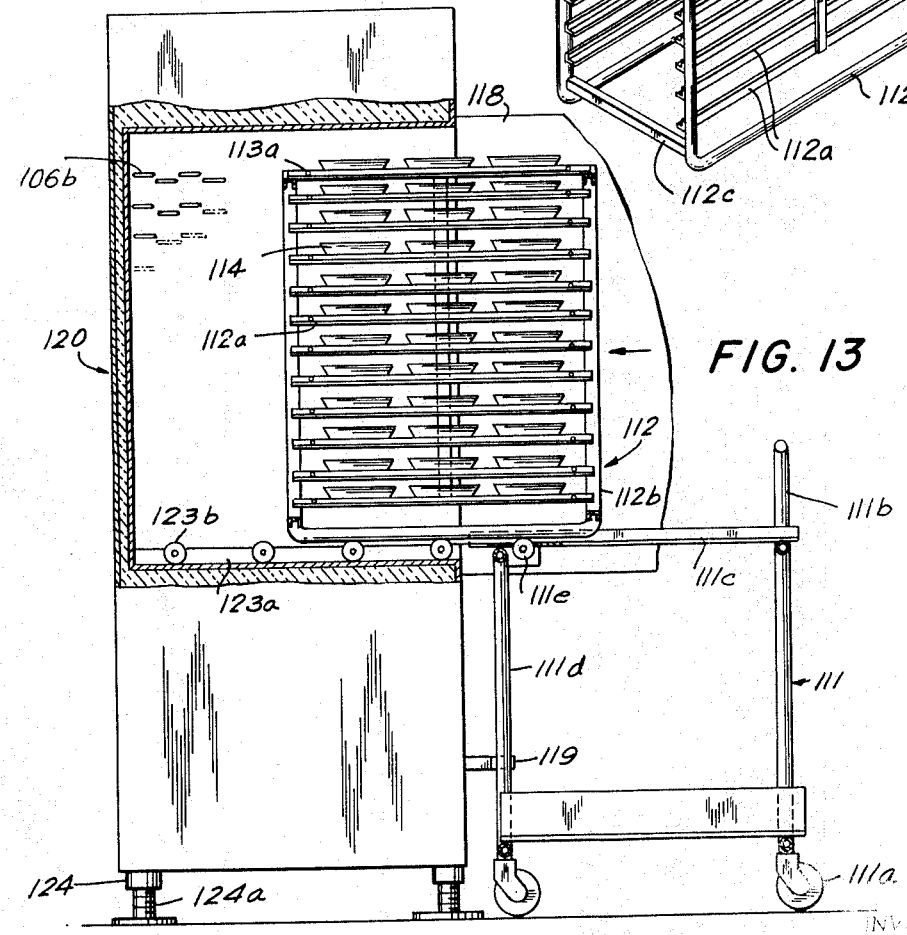

United States Patent Office 3,261,343
Patented July 19, 1966

3,261,343
APPARATUS FOR HEATING FOOD
Bengt Gunnar Julius Tibell, Bandhagen, Sweden, assignor to Aktiebolaget Electrolux, Stockholm, Sweden, a corporation of Sweden
Filed Feb. 21, 1964, Ser. No. 346,502
14 Claims. (Cl. 126—21)

This invention relates to apparatus for heating food and is especially concerned with rapidly heating to a definite elevated temperature a plurality of receptacles containing food, such as frozen food packages, for example, which are openly stacked one above another in vertically spaced relation in an upright heating space.

It has been proposed heretofore to form a continuously moving body of heated air in a heating space in which successive portions pass only once from an air inlet side of the space to an opposite air outlet side thereof and discharge from the heating space. The continuously moving body of heated air is formed by dividing the heated air into a plurality of air streams at the air inlet side and forcibly flowing the heated air to the heating space at a sufficiently high velocity for all of the air streams to flow contiguous to and in physical contact with one another and horizontally one above another from the air inlet side of the heating space, and by discharging the streams from the heating space exteriorly thereof at the air outlet side of the space.

A circuit for circulation of heated air is provided which includes the heating space and conduit structure respectively communicating with the air inlet and air outlet sides of the heating spaces. The conduit structure includes a vertical air delivery channel at the air inlet side of the heating space which functions to distribute the heated air and introduce the distributed air into the heating space in a plurality of air streams through slots in the air inlet side thereof. The conduit structure also includes a vertical air discharge channel at the air outlet side of the heating space which functions to promote discharge of the air streams from the space through slots in the air outlet side thereof.

It is an object of the invention to provide an improvement in apparatus of this kind for uniformly heating to a definite elevated serving temperature food held in a plurality of receptacles of substantially the same size, such as frozen food packages, for example, which are openly stacked one above another in vertically spaced relation in an upright or vertically extending heating space. This is accomplished by providing conduit structure communicating with the air inlet and air outlet sides of the heating space which embodies a vertical air delivery channel defined in part by the air inlet side having slots distributed therein whose total cross-sectional area is within a range from about forty-five to seventy percent of the maximum cross-sectional area of the vertical air delivery channel. More particularly, the air delivery channel has spaced flat sides, the slotted air inlet side of the heating space being one of them, which converge toward one another in the upward direction of air flow from a lower wide air inlet end to an upper narrow closed end, the maximum cross-sectional area of the channel being at its lower wide air inlet end with successive portions of the channel from its lower end to its upper closed end being increasingly smaller in cross-section.

Further, the improved air delivery channel embodying the invention cooperates with a vertical air discharge channel like the air delivery channel and defined in part by the air outlet side of the heating space and formed with a narrow closed upper end and a lower wide air outlet end, the maximum cross-sectional area of the discharge channel being at its lower wide air outlet end with successive portions in an upward direction to its upper closed end being increasingly smaller in cross-section.

Further objects and advantages of the invention will become apparent as the following description proceeds, and the various features of novelty which characterize the invention are pointed out with particularity in the claims annexed to and forming a part of this specification.

For a better understanding of the invention, reference may be had to the following description taken in connection with the accompanying drawing, in which:

FIGS. 1 and 2 are views diagrammatically illustrating heating ovens embodying the invention;

FIG. 3 is an enlarged fragmentary vertical sectional view of the heating oven shown in FIG. 1;

FIGS. 3A and 3B are fragmentary vertical sectional views of details of a heating oven like that shown in FIG. 3 which illustrate a modification of the invention;

FIGS. 4 and 5 are views in elevation of side walls of heating spaces embodied in ovens shown in FIGS. 1, 2 and 3;

FIGS. 6 and 7 are top views of the slotted side walls shown in FIGS. 4 and 5;

FIG. 8 is a front elevational view illustrating food handling structure for transferring food into and out of the oven shown in FIG. 1;

FIG. 9 is a top plan view of the food handling structure shown in FIG. 8 with the food frames removed therefrom and the front of the heating oven shown in FIG. 1;

FIG. 10 is an end view of the food handling structure shown in FIG. 9;

FIG. 11 is a perspective view of the food frame shown in FIG. 8;

FIG. 12 is a perspective view of an apertured shelf for the food frames shown in FIGS. 8 and 11;

FIG. 13 is an end view of the heating oven shown in FIG. 1 and the food handling structure shown in FIGS. 8, 11 and 12 with the food handling structure adjacent to the heating oven;

FIG. 14 is a fragmentary vertical sectional view of the heating oven shown in FIG. 1, taken at line 14—14 of FIG. 15, illustrating the food frame and shelf of FIGS. 11 and 12 in the heating oven shown in FIG. 1;

FIG. 15 is a horizontal sectional view taken at line 15—15 of FIG. 14; and

FIGS. 16 and 17 are vertical sectional views taken at lines 16—16 and 17—17, respectively, of FIG. 14.

Referring to FIGS. 1 and 2, ovens 120 and 120' embodying the invention are shown which are provided with hollow interiors having insulated walls 117 and 117' within which are disposed casings 121a, 121b and 121 defining heating zones or spaces 101a, 101b and 101, respectively, adapted to receive receptacles 114 containing food to be heated.

In FIG. 2 a motor 102' is arranged to drive a fan 103' for discharging air in an air flow line past heating element 104' into a vertically extending passage 105' which may be referred to as an air delivery channel. The passage 105' is defined by the right-hand side wall of the casing 121 which is vertical and erect and a wall 122a' spaced therefrom which is inclined from the vertical and slopes inward toward the right-hand side wall of the casing 121.

The right-hand side wall of the casing 121 is provided with slots 106a' for dividing the heated air in the air delivery channel 105' into a plurality of streams which pass through the heating space 101 in substantially parallel paths of flow. The opposite side wall of the casing 121 is provided with slots 106b' for discharging air exteriorly of the heating space 101. The air discharged from the heating space 101 passes into vertically extending passage or air discharge channel 107' in which air emerging from the slots 106b' is collected. The air discharge channel 107' is defined by the left-hand side wall of the casing 121 which is vertical and erect and a wall 122b' spaced therefrom which is inclined from the vertical and slopes inward toward the left-hand side wall of the casing 121. The air collected in the air discharge channel 107' flows downward therein to the inlet of the fan 103' from which air is discharged in the air flow line past the heating element 104'.

In FIG. 1 a motor 102 is arranged to drive a fan 103 for discharging air past heating elements 104. The heated air flows from the heating elements 104 into vertically extending air delivery channels 105. The outer walls of the heating spaces 101a and 101b are provided with slots 106a for dividing the heated air in the air delivery channels 105 into a plurality of streams which pass through the heating spaces 101a and 101b in substantially parallel paths of flow in physical contact with one another. The opposite inner side walls of the heating spaces are provided with slots 106b for discharging air exteriorly of the heating spaces.

The air discharged from the heating spaces 101a and 101b passes into vertically extending air discharge channels 107 in which air emerging from the slots 106b is collected. The air discharge channels 107, which are formed by a V-shaped member 107a disposed between the inner side walls of the casings 121a and 121b, provide downward paths of flow for air. The air collected in the air discharge channels 107 flows downward therein to the inlet of the fan 103 from which air is discharged past the heating elements.

In FIG. 1 the air delivery channels 105 are formed by the outer side walls of the casings 121a and 121b, which are vertical and erect, and walls 122a and 122b spaced therefrom which are inclined from the vertical and slope inward toward the right-hand side wall of the casing 121a and left-hand side wall of the casing 121b, respectively.

The heating ovens 120 and 120' illustrated in FIGS. 1 and 2 and just described are especially suitable for rapidly heating at one time food held in a large number of receptacles. In order to insert a large number of the receptacles of substantially the same size into the ovens all at one time and also to remove them from the ovens all at one time, food handling structure like that shown in FIGS. 8, 9 and 10 may be employed. The food handling structure comprises a cart 111 which is movable on wheels 111a with the aid of a handle 111b and provided with two pairs of L-shaped members 111c extending transversely of the cart. As seen in FIGS. 9 and 13, the L-shaped members 111c may be provided with rollers 111e mounted for rotation thereon.

Each pair of L-shaped members 111c serves as a support for a vertically extending frame 112 shown in FIGS. 8, 11 and 13. Each frame 112 comprises spaced U-shaped side members 112b which are connected by end cross members 112c and the bottoms of which serve as skids. Each side member 112b is provided with L-shaped rails 112a which are vertically spaced one above another and serve to support apertured shelves 113. Each shelf 113 comprises a frame 113a of rectangular form and wire mesh or screening 113b secured thereto, as best shown in FIGS. 12, 13 and 15.

After the receptacles 114 are positioned on the shelves 113 and the frames 112 are loaded to provide three vertical stacks of the receptacles on each frame, the door structure 118 of the oven 120 may be opened and the cart 111 moved in front of the heating spaces 101a and 101b, as shown in FIG. 13. The L-shaped members 111c desirably are aligned with spaced tracks or rails 123a in the bottom end walls of the heating spaces 101a and 101b, the rails 123a being best shown in FIGS. 13 and 15. Stated another way, the tracks or rails 123a form guideways at surfaces at the vicinities of the bottom walls of the vertically extending heating spaces or zones 101a and 101b. To locate the cart 111 in its proper food handling position in front of the oven 120, the latter may be provided with suitable fastening members, such as C-shaped clips 119, to receive and hold the legs 111d adjacent to and immediately in front of the oven, as best shown in FIGS. 9 and 13.

Rollers 123b may be mounted on the rails 123a for rotation thereon to facilitate transfer of the frames 112 from the cart 111 into the heating spaces 101a and 101b and from the latter back to the cart 111. As shown in FIG. 13, the oven 120 may be provided with legs 124 which are vertically adjustable at 124a to adjust the oven vertically with respect to the cart 111, so that the rails 111c on the cart and the rails 123a in the bottom walls of the heating spaces will be at the same height. After the frames 112 are pushed into the heating spaces 101a and 101b to form a part of the oven structure to heat food packages in vertically extending heating zones, the cart 111 can be moved from the front of the oven 120 and the door structure 118 closed, and heating of all the receptacles 114 will commence at the same time.

As shown in FIGS. 4 and 16, the slots 106a at the outer air inlet sides 121a' and 121b' of the heating spaces 101a and 101b, respectively, are formed in horizontal rows which are vertically spaced from one another. As shown in FIGS. 5 and 17, the slots 106b at the inner air outlet sides 121a'' and 121b'' of the heating spaces 101a and 101b, respectively, also are formed in horizontal rows which are vertically spaced from one another. The slots 106a in each row of slots at the air inlet sides 121a' and 121b' of the heating spaces are in horizontal alignment in single file. The slots 106b in each row of slots at the air outlet sides 121a'' and 121b'' of the heating spaces are divided into two vertically spaced groups which are closely adjacent to one another and in staggered relation, alternate slots in each row forming one group and the remaining slots in the row forming the other group, whereby the slots 106b in each row extend in a zig-zag path from the front to the rear of the heating spaces 101a and 101b at the air outlet sides thereof.

The receptacles 114 are stacked in the frames 112 so that the divided air streams introduced through the slots 106a are directed primarily over the tops of the receptacles 114 on one of the shelves 113 in the stacks and below the receptacles on the next higher shelf 113 in the stacks, as illustrated in FIGS. 14, 16 and 17. The height of the receptacles 114 is at least half of the vertical distance between adjacent apertured shelves 113, whereby the gaps between the receptacles 114 in the several stacks are relatively narrow and will promote the sweeping effect of the divided heated air streams flowing past the receptacles and heat transfer to the food in the receptacles 114 by air convection. Hence, the receptacles 114 are supported on the shelves 113 in such manner that the receptacles offer minimum resistance to flow of heated air in the heating spaces. As best shown in FIG. 17, the slots 106b at the air outlet sides of the heating spaces 101a and 101b also are vertically disposed with respect to the shelves 113 and receptacles 114 to promote discharge of the air streams flowing over the tops and bottoms, respectively, of the receptacles in the several stacks.

When heating of food in the receptacles 114 is being effected objectionable fumes often are produced which are taken up by the circulating heating air. Also, when the receptacles 114 contain frozen food which must be both thawed and heated before it is served, the heating air becomes laden with moisture in the form of water vapor. In order to remove fumes and moisture from the heating air, the ovens 120 and 120' in FIGS. 1 and 2 are provided with vents, as indicated at 125 and 125', respectively. By providing the vents the circuits for circulation of heating air in the ovens 120 and 120' operate substantially at atmospheric pressure and suitable conduits (not shown) may be connected to the vents 125 and 125' in which the vented water vapor condenses and through which the condensed moisture is conducted to waste along with the fumes vented from the ovens.

After the food in the receptacles 114 has been heated a sufficient length of time in the heating zones 101a and 101b within the oven interior and the food in all of them is heated to the definite elevated temperature, the door structure 118 can be opened and the cart 111 detachably connected to the front of the oven with the aid of the C-shaped clips 119. The frames 112 can be moved forward from the heating spaces 101a and 101b and onto the tracks or rails 111c of the cart 111, and the cart can then be detached from the heating oven 120.

In the heating ovens 120 and 120' being described, the fans 103 and 103' function to deliver heated air at a sufficiently high velocity for the air to be divided at the air inlet slots 106a and 106a' into a plurality of streams which flow contiguous to and in physical contact with one another and horizontally one above another from the air inlet sides to the air outlet sides of the heating spaces and discharge through the slots 106b and 106b' exteriorly of the heating spaces.

The air delivery channels 105 and 105' function to distribute the heated air at the air inlet sides of the heating spaces in such manner that each distributed part of the heated air is introduced into the heating spaces at the slots 106a and 106a' at an inlet pressure to cause all of the streams to flow at substantially the same speed across the heating spaces from the air inlet sides to the air outlet sides thereof.

As previously explained, the air delivery channels 105 in FIG. 1 are defined by the outer side walls 121a' and 121b' of the heating spaces 101a and 101b, which are vertical and erect, and the walls 122a and 122b spaced therefrom which slope inward from the ends of the oven 120. As best shown in FIGS. 3 and 15, the air delivery channels 105 are rectangular in horizontal cross-section and successive portions thereof in the upward direction of air flow have increasingly smaller cross-sectional areas.

In order to promote uniform distribution of heated air in the air delivery channels 105 of the oven 120, the opposing sides 121a', 122a and 121b', 122b of the channels do not meet or come together at their upper ends to form sharp apices, but instead are spaced from one another through out their entire vertical height. Hence, the outer sloping walls 122a and 122b of the channels 105 are spaced from the vicinities of all of the slots 106a in the inner walls 121a' and 121b' thereof. Also, the opposing side walls of the channels 105 are spaced apart at their extreme upper closed ends, as indicated at 105a in FIG. 3, the regions at which the upward paths of flow of heated air terminate. Further, a part of each air delivery passage 105 extends upward from the highest row of air inlet slots 106a to the extreme upper closed ends 105a of the channels. With this construction, it has been discovered that the air streams at the extreme upper parts of the heating spaces 101a and 101b will flow from the air inlet sides to the air outlet sides of the heating spaces at more nearly the same speed as the air streams at the bottom parts thereof.

A modification of the air delivery channels 105 of FIG. 3 is shown in FIGS. 3A and 3B. In FIGS. 3A and 3B the air delivery channels 205 are also defined by the air inlet sides 221a' and 221b' of the heating spaces and the inwardly sloping walls 222a and 222b spaced therefrom. The sloping outer walls 222a and 222b are spaced from the vicinities of all of the air inlet slots 206a in the air inlet sides 221a' and 221b' of the heating spaces. The top end walls 205a of the air delivery channels 205 are not horizontal as are the end walls 105a in FIG. 3, but are inclined and form apices with the inner walls 221a' and 221b' of the channels. Even with this construction parts of the upward paths of flow for the heated air in the air delivery channels 205 extend upward beyond the top row of air inlet slots 206a to provide dead-end spaces which promote the desired distribution of heated air at the air inlet sides of the heating spaces.

The function of the air delivery channels 105 in FIG. 3 and 205 in FIGS. 3A and 3B is to effect such distribution of the heated air therein that the air will be divided into horizontal streams at the spaced vertical rows of slots 106a and the streams will flow at substantially the same speed across the heating spaces. In order that the speed of the air streams will be substantially the same, the heated air desirably should be introduced into the air inlet slots 106a, which are of the same size, at substantially the same inlet pressure. It has been discovered that when the total area of the air inlet slots 106b is within a range from about 45 percent to 70 percent of the maximum cross-sectional area of the air delivery channel, the desired distribution of air in the air delivery channel is promoted and each distributed part of the heated air will be introduced into a different one of the slots 106a at substantially the same inlet pressure.

By way of example and without limitation, a heating oven has been constructed like that shown in FIGS. 1, 3, 4, 14 and 15 in which the outer side walls 121a and 121b' of the casings 121a and 121b are about 600 mm. deep and about 800 mm. high, each outer side wall having six slots in a row and thirteen vertically spaced rows of slots. Each slot 106a is about 7 mm. high and 50 mm. long, and since there are seventy-eight slots distributed in the air inlet sides of the heating spaces, the total cross-sectional area of the air inlet slots at each air inlet side is about 26,900 sq. mm.

The maximum cross-sectional area of each air delivery channel 105 is at its lower inlet end, as indicated by the dotted lines 105b in FIG. 3. Since the air delivery channels 105 also are about 600 mm. deep and about 95 mm. wide at their lower air inlet ends 105b, the maximum cross-sectional area of each air inlet channel is about 57,000 sq. mm. In the heating oven being described, therefore, the total cross-sectional area of the air inlet openings 106a at the air inlet side of each heating space is about 47 percent of the maximum cross-sectional area of an air delivery channel 105 at its air inlet end at 105b.

Further, the width of each air delivery channel 105 at its closed end at 105a is about 30 percent of the width at its inlet end at 105b and the path of flow of air extends upward past the top row of slots 106a for a vertical height which is at least the same or exceeds the width of the air delivery channel at the vicinity of the top row of slots 106a. Air delivery channels 105 like those just described function in a satisfactory manner to effect the desired distribution of heated air with the distributed parts being introduced into the air inlet slots 106a at substantially the same inlet pressure to cause all of the air streams to flow across the heating spaces at substantially the same speed.

To promote the uniform speed of the air streams in the heating spaces 101a and 101b, the air discharge channels 107 are like the air delivery channels 105. In the heating oven being described the widths of the air discharge channels 107 at their closed ends 107a and at their widest portions 107b are essentially the same as the widths of the air delivery channels 105 at 105a and 105b, respectively. Further, the total cross-sectional area of the air outlet slots 106b for each heating space desirably is from 25 percent to 100 percent greater than the total cross-sectional area of the air inlet slots therefor. In the heating oven being described and like that shown in FIGS. 1, 3, 4 and 5, for example, each of the inner side walls 121a'' and 121b'' of the casings 121a and 121b has twelve slots 106b in zig-zag formation in each row and thirteen vertically spaced rows of slots. Since each slot 106b also is about 7 mm. high and 50 mm. long in the oven being described, the total cross-sectional area of the air outlet slots at each air outlet side is about 53,800 sq. mm. and about 100 percent greater than the total cross-sectional area of the air inlet openings 106a and approaches the maximum cross-sectional area of about 57,000 sq. mm. of the air discharge channels 107 at their lower outlet ends 107b.

Since there are six slots 106a in each row of slots at the air inlet sides of the heating spaces and each slot is 50 mm long, it will be seen that the overall length of the slots is about 300 mm. and at least half of the depth of 600 mm. of the heating spaces. Since there are twelve slots 106b in each row of slots at the air outlet sides of the heating spaces and each slot is 50 mm. long and the slots are practically in end-to-end relation, it will be seen that the overall length of the slots is about 600 mm. and practically equal to the depth of 600 mm. of the heating spaces. Further, the total cross-sectional area of the air outlet slots 106b and the maximum cross-sectional area of the air discharge channels 107, which is at their lower air outlet ends at 107b, may be substantially the same.

In the heating oven which has been constructed and like that described, it is possible to heat seventy-two frozen food packages at one time arranged in six stacks of twelve packages each, each frame 112 holding three stacks of the packages. Before the frozen food packages, which are at a temperature of about −20° C. to −25° C., are inserted into the oven, which is provided with a suitable thermostatic control (not shown), the oven under thermostatic control desirably is preheated to a temperature of about 230° C. When the oven is empty and preheated to such a high temperature, the maximum temperature differential in each heating space 101a and 101b may be about 2.8° C. When the oven has attained the temperature of about 230° C., the oven thermostat may then be adjusted to maintain the heating spaces at a predetermined temperature of about 180° C. and all of the frozen food packages inserted into the heating oven at one time. Separate timer mechanisms may be employed to control the length of time heating is effected by the heating elements 104 and the length of time the fan 103 operates, and it may be desirable to allow the fan 103 to operate for a short time, such as five minutes, for example, after the heating elements cease to operate, to promote uniform heating of the food packages. In an overall cooking time of about twenty to thirty minutes the frozen food packages will all be heated to substantially the same temperature, which is the definite elevated temperature at which the food is to be served.

When the heating oven 120 is being heated to an elevated temperature ranging from 180° C. to 230° C., for example, there is a tendency for the slotted air inlet and outlet sides of the heating spaces 101a and 101b to warp. Warping of the slotted air inlet sides of the heating spaces causes them to assume a wave-like form which tends to produce variations in the inlet pressure of the heated air at the air inlet slots 106a. In order to reinforce the air inlet and air outlet sides of the heating spaces 101a and 101b and prevent warping thereof, L-shaped angle members 126a and 126b, which extend vertically between the top and bottom parts of the side walls of the casings 121a and 121b, are fixed to the outer faces thereof, as by welding or brazing, for example.

Modifications of the embodiments of the invention which have been described and illustrated will occur to those skilled in the art, so that it is desired not to be limited to the particular arrangements set forth. Moreover, certain features of the invention can be advantageously employed independently of other features. Therefore, it is intended in the claims to cover all those modifications and features which do not depart from the spirit and scope of the invention. However, subject matter shown in FIGS. 1 to 7 and in FIGS. 13 to 17 and described herein which is common to this application and to copending application Serial No. 346,549, filed February 21, 1964, and not being claimed herein is being claimed in application Serial No. 346,549. Also, food handling structure like that shown in FIGS. 8 to 13 and described herein for use in combination with heating ovens like those shown in FIGS. 1 to 7 and 14 to 17 is being claimed in copending application Serial No. 346,560, filed February 21, 1964.

What is claimed is:

1. Apparatus for heating to a definite elevated temperature food held in receptacles of substantially the same size comprising:
    (a) a casing having opposing side walls and top and bottom end walls defining an upright heating space,
    (b) structure for openly stacking a plurality of the receptacles one above another in vertically spaced relation in the heating space, said stacking structure comprising vertically spaced apertured shelves disposed one above another for supporting the receptacles in the stack,
    (c) the opposing side walls having vertically spaced slots and respectively defining an air inlet side and an air outlet side of the heating space,
    (d) a circuit for circulation of air including the heating space and conduit structure having one end communicating with the air inlet side of the heating space and the opposite end communicating with the air outlet side thereof,
    (e) means in the conduit structure for heating air flowing to the air inlet side of the heating space,
    (f) means in the conduit structure for forcibly circulating the air at a sufficiently high velocity for the heated air flowing to the air inlet side to be divided at the slots therein to produce a plurality of air streams which flow contiguous to and in physical contact with one another and horizontally one above another from the air inlet side to the air outlet side of the heating space and discharge through the slots in the air outlet side exteriorly of the heating space,
    (g) the conduit structure comprising the slotted air inlet side of the heating space to provide a vertically extending air delivery channel with successive zones thereof in the direction of air flow having increasingly smaller cross-sectional areas, and
    (h) distributing means embodied in the air delivery channel which includes distributing at the air inlet side a plurality of the slots having a total cross-sectional area within a range from about forty-five to seventy percent of the maximum cross-sectional area of the air delivery channel for distributing the heated air and introducing each distributed part of the heated air into the slots at the air inlet side at an inlet pressure to cause all of the air streams to flow substantially at the same speed across the heating space from the air inlet side to the opposite air outlet side, whereby the air streams collectively will form a continuously moving body of air in the heating space which envelops all sides of the receptacles in the stack with successive portions thereof passing only once from the air inlet side to the air outlet side to rapidly heat all of the food in the receptacles in the stack uniformly and for the food in all of the receptacles to reach the definite elevated temperature at substantially the same time.

2. Apparatus as set forth in claim 1 in which the conduit structure providing the vertically extending air delivery channel has spaced inner and outer walls, the side wall of the casing defining the air inlet side of the heating space forming the inner wall of the passage which is essentially vertical, the outer wall sloping toward the inner wall in the direction of air flow and being spaced from all parts of the inner wall at the vicinities of the slots therein.

3. Apparatus as set forth in claim 1 in which the slots in the air inlet side of the heating space are formed in horizontal rows vertically spaced from one another and the conduit structure has spaced inner and outer walls providing the vertically extending air delivery channel having a lower air inlet end for upward flow of air therein, the side wall of the casing defining the air inlet side of the heating space forming the inner wall of the passage which is substantially vertical, and the outer wall sloping toward the inner wall in the upward direction of air flow and being spaced from all parts of the inner wall at the vicinities of the slots therein.

4. Apparatus as set forth in claim 3 in which the slots in each horizontal row at the air inlet side of the heating space are disposed in end-to-end relation in single file.

5. Apparatus as set forth in claim 4 in which the slots in each row at the air inlet side of the heating space are horizontally elongated and collectively take up at least fifty percent of the overall depth of the air inlet side of the heating space.

6. Apparatus as set forth in claim 1 in which the slots in the opposing side walls of the casing are formed in horizontally extending rows vertically spaced from one another, each row of slots in the air inlet side of the heating space being substantially opposite a different one of the rows of slots in the air outlet side of the heating space, the slots in each horizontal row at the air inlet side of the heating space being elongated horizontally and disposed in end-to-end relation in single file, and the total cross-sectional area of the slots at the air outlet side of the heating space being greater than the total cross-sectional area of the slots at the air inlet side of the heating space.

7. Apparatus as set forth in claim 6 in which the slots in each horizontal row at the air outlet side of the heating space are divided into two vertically spaced groups which are closely adjacent to one another and in staggered relation, alternate slots in each horizontal row at the air outlet side forming one group and the remaining slots in the row forming the other group, whereby the slots in each row extend in a zig-zag path from the front to the rear of the heating space at the air outlet side thereof.

8. Apparatus as set forth in claim 7 in which the vertically spaced apertured shelves of the stacking structure have vertical gaps therebetween and are vertically offset with respect to the vertically spaced horizontal rows of slots in the air inlet and air outlet sides of the heating space for the air streams to be introduced and discharged into and from the heating space through the rows of air inlet slots and rows of air outlet slots, respectively, in the top halves of the gaps between the shelves.

9. Apparatus for heating to a definite elevated temperature food held in a plurality of receptacles of substantially the same size comprising
 (a) a casing having opposing side walls and top and bottom end walls defining an upright heating space,
 (b) structure for openly stacking a plurality of the receptacles one above another in vertically spaced relation in the heating space, said stacking structure comprising vertically spaced apertured shelves disposed one above another for supporting the receptacles in the stack,
 (c) the opposing side walls having vertically spaced slots and respectively defining an air inlet side and an air outlet side of the heating space,
 (d) a circuit for circulation of air including the heating space and conduit structure having one end communicating with the air inlet side of the heating space and the opposite end communicating with the air outlet side thereof,
 (e) means in the conduit structure for heating air flowing to the air inlet side of the heating space,
 (f) means in the conduit structure for forcibly circulating the air at a sufficiently high velocity for the heated air flowing to the air inlet side to be divided at the slots therein to produce a plurality of air streams which flow contiguous to and in physical contact with one another and horizontally one above another from the air inlet side to the air outlet side of the heating space and discharge through the slots in the air outlet side exteriorly of the heating space,
 (g) the conduit structure comprising (1) the slotted air inlet side of the heating space to provide a vertical air delivery channel having spaced walls converging toward one another from a lower air inlet end of the channel to an upper closed end thereof and (2) the slotted air outlet side of the heating space to provide a vertical air discharge channel having spaced walls converging toward one another from a lower air outlet end of the channel to an upper closed end thereof, and
 (h) distributing means embodied in the air delivery channel which includes (1) distributing at the air inlet side a plurality of the slots having a total cross-sectional area within a range from about forty-five to seventy percent of the maximum cross-sectional area of the air delivery channel at its lower air inlet end for distributing the heated air and introducing each distributed part of the heated air into the slots at the air inlet side at an inlet pressure to cause all of the air streams to flow substantially at the same speed across the heating space from the air inlet side to the opposite air outlet side and (2) distributing at the air outlet side a plurality of slots having a total cross-sectional area greater than the total cross-sectional area of the slots at the air inlet side to promote discharge of the air streams at the air outlet side through the slots therein exteriorly of the heating space and the combining of the discharged air streams, whereby all of the food in the receptacles in the stack will be rapidly heated uniformly and the food in all of the receptacles will reach the definite elevated temperature at substantially the same time.

10. Apparatus as set forth in claim 9 in which the slots in the air inlet and air outlet sides of the heating space are elongated and horizontally disposed in horizontal rows vertically spaced from one another, each row of slots in the air inlet side of the heating space being substantially opposite a different one of the rows of slots in the air outlet side of the heating space, the slots in each horizontal row at the air inlet side being disposed in end-to-end relation in single file, the slots in each horizontal row at the air outlet side of the heating space being divided into two vertically spaced groups which are closely adjacent to one another and in staggered relation, alternate slots in each horizontal row at the air outlet side forming one group and the remaining slots in the row forming the other group, whereby the slots in each row extend in a zig-zag path from the front to the rear of the heating space at the air outlet side thereof, and the total cross-sectional area of the slots at the air outlet side being greater than the total cross-sectional area of the slots at the air inlet side.

11. Apparatus as set forth in claim 10 in which the slots in each row at the air inlet side are horizontally elongated and collectively take up at least fifty percent of the overall depth of the air inlet side of the heating space.

12. Apparatus as set forth in claim 11 in which the slots in each row at the air outlet side collectively take up substantially one hundred percent of the overall depth of the air outlet side of the heating space.

13. Apparatus for heating to an elevated temperature food held in a plurality of receptacles of substantially the same size comprising
 (a) structure defining a vertically extending heating zone,
 (b) said structure including spaced vertically extending members defining opposing sides of the heating zone and means for openly stacking a plurality of the receptacles one above another in vertically spaced relation in the heating zone between the sides thereof, the stacking means comprising vertically spaced apertured shelves disposed one above another for supporting the receptacles in the stack,
 (c) the opposing sides of the heating zone having vertically spaced slots and respectively defining an air inlet side and an air outlet side of the heating zone.

(d) a circuit for circulation of air including the heating zone and an air flow line having one end thereof communicating with the air inlet side of the heating zone and the opposite end thereof communicating with the air outlet side thereof, (e) means in the air flow line for heating air flowing to the air inlet side of the heating zone, (f) means in the air flow line for forcibly circulating the air at a sufficiently high velocity for the heated air flowing to the air inlet side to be divided at the slots to produce a plurality of air streams which flow contiguous to and in physical contact with one another and one above another from the air inlet side toward the air outlet side of the heating zone and discharge from the zone through the slots in the air outlet side thereof, (g) the air flow line comprising structure including the slotted air inlet side of the heating zone to provide a vertically extending air passageway with successive portions thereof in the direction of air flow having increasingly smaller cross-sectional areas, and (h) distributing means embodied in the vertically extending air passageway which includes distributing at the air inlet side of the heating zone a plurality of slots having a total cross-sectional area within a range from about forty-five to seventy percent of the maximum cross-sectional area of the vertically extending air passageway to promote distribution of the heated air and the introduction of the distributed heated air into the slots at the air inlet side at an inlet pressure to cause the air streams to flow across the heating zone from the air inlet side thereof toward the air outlet side thereof, whereby successive portions of the air streams pass from the air inlet side of the heating zone to the air outlet side thereof to rapidly heat the food in the receptacles in the stack in the path of flow of the air streams at substantially the same rate to the elevated temperature.

14. Apparatus for heating to an elevated temperature food held in a plurality of receptacles of substantially the same size comprising (a) structure defining a vertically extending heating zone, (b) said structure including spaced vertically extending members defining opposing sides of the heating zone and means for openly stacking a plurality of the receptacles one above another in vertically spaced relation in the heating zone between the sides thereof, the stacking means comprising vertically spaced apertured shelves disposed one above another for supporting the receptacles in the stack, (c) the opposing sides of the heating zone having vertically spaced slots and respectively defining an air inlet side and an air outlet side of the heating zone, (d) a circuit for circulation of air including the heating zone and an air flow line having one end thereof communicating with the air inlet side of the heating zone and the opposite end thereof communicating with the air outlet side thereof, (e) means in the air flow line for heating air flowing to the air inlet side of the heating zone, (f) means in the air flow for forcibly circulating the air at a sufficiently high velocity for the heated air flowing to the air inlet side to be divided at the slots therein to produce a plurality of air streams which flow contiguous to and in physical contact with one another and one above another from the air inlet side toward the air outlet side of the heating zone and discharge from the zone through the slots in the air outlet side thereof, (g) the air flow line comprising first and second vertically extending air passageways at the opposing (1) air inlet and (2) air outlet sides, respectively, of the heating zone, the first and second vertically extending air passageways having spaced walls defined by the opposing sides of the heating zone and a pair of vertically extending wall members, each one of the wall members being adjacent to a different one of the sides of the heating zone, at least one of the walls of each passageway being inclined from the vertical and sloping toward the other wall thereof whereby successive portions of the first passageway in the direction of air flow have increasingly smaller cross-sectional areas and successive portions of the second passageway in the direction of air flow have increasingly greater cross-sectional areas, and (h) distributing means embodied in the first vertically extending air passageway which includes (3) distributing at the (1) air inlet side of the heating zone a plurality of the slots having a total cross-sectional area within a range from about forty-five to seventy percent of the maximum cross-sectional area of the first vertically extending air passageway at its air inlet end to promote distribution of the heated air and the introduction of the distributed heated air into the slots at an inlet pressure to cause the air streams to flow across the heating zone from the (1) air inlet side thereof toward the (2) air outlet side thereof and (4) distributing at the (2) air outlet side a plurality of slots having a total cross-sectional area greater than the total cross-sectional area of the slots at the (1) air inlet side to promote discharge of the air streams from the heating zone through the slots at the (2) air outlet side thereof, whereby the food in receptacles in the stack between the (1) air inlet side and (2) air outlet side of the heating zone will be rapidly heated at substantially the same rate to the elevated temperature.

References Cited by the Examiner

UNITED STATES PATENTS 2,490,076  12/1949  Maxson _____ 126—21

FOREIGN PATENTS 1,198,612  6/1959  France.
1,268,923  6/1961  France.
812,417  4/1959  Great Britain.

FREDERICK L. MATTESON, Jr., *Primary Examiner.*

JAMES W. WESTHAVER, *Examiner.*

E. G. FAVORS, *Assistant Examiner.*